(12) United States Patent
Kawabata et al.

(10) Patent No.: US 10,396,377 B2
(45) Date of Patent: Aug. 27, 2019

(54) FUEL CELL DEVICE (71) Applicant: KYOCERA Corporation, Kyoto-shi, Kyoto (JP)

(72) Inventors: Naoki Kawabata, Daito (JP); Nobuhiko Hachiki, Omihachiman (JP)

(73) Assignee: KYOCERA Corporation, Kyoto-shi, Kyoto (JP)

( * ) Notice: Subject to any disclaimer, the term of this patent is extended or adjusted under 35 U.S.C. 154(b) by 0 days.

(21) Appl. No.: 15/126,659

(22) PCT Filed: Mar. 18, 2015

(86) PCT No.: PCT/JP2015/058147
§ 371 (c)(1),
(2) Date: Sep. 16, 2016

(87) PCT Pub. No.: WO2015/141752
PCT Pub. Date: Sep. 24, 2015

(65) Prior Publication Data
US 2017/0084940 A1 Mar. 23, 2017

(30) Foreign Application Priority Data
Mar. 18, 2014 (JP) .................. 2014-055021

(51) Int. Cl.
H01M 8/04746 (2016.01)
H01M 8/0662 (2016.01)
(Continued)

(52) U.S. Cl.
CPC ... H01M 8/04753 (2013.01); H01M 8/04089 (2013.01); H01M 8/04373 (2013.01);
(Continued)

(58) Field of Classification Search
None
See application file for complete search history.

(56) References Cited

U.S. PATENT DOCUMENTS

2008/0044693 A1* 2/2008 Benziger ........... H01M 8/04089
429/430
2013/0137007 A1* 5/2013 Lee .................. H01M 8/04447
429/444

FOREIGN PATENT DOCUMENTS

EP 2256850 A1 12/2010
EP 2416428 A1 2/2012
(Continued)

OTHER PUBLICATIONS

Hamada et al. (JP, 2006-093023) (a raw machine translation) (Abstract, Detailed Description & Drawings) (Apr. 6, 2006).*
(Continued)

Primary Examiner — Carmen V Lyles-Irving
(74) Attorney, Agent, or Firm — Viering, Jentschura & Partner MBB (57) ABSTRACT A fuel cell device according to the present invention includes a controller. The controller is configured to allow a fuel gas supply device and an oxygen-containing gas supply device to supply the fuel gas and the oxygen-containing gas supplied to fuel cells (19) in a supply amount less than a supply amount to be set in accordance with a decreased power as required by the external load as well as to cause an igniter to start operation if the power required by the external load decreases and flameout of the combustion in a combustor (45) is recognized.

11 Claims, 6 Drawing Sheets (51) Int. Cl.
*H01M 8/0432* (2016.01)
*H01M 8/0612* (2016.01)
*H01M 8/04089* (2016.01)
*H01M 8/124* (2016.01)

(52) U.S. Cl.
CPC ....... *H01M 8/0625* (2013.01); *H01M 8/0662* (2013.01); *H01M 2008/1293* (2013.01)

(56) References Cited

FOREIGN PATENT DOCUMENTS

| JP | H11304115 A | 11/1999 |
| JP | 2003-168453 A | 6/2003 |
| JP | 2006-093023 A | 4/2006 |
| JP | 2007-059377 A | 3/2007 |
| JP | 2010-153064 A | 7/2010 |
| JP | 2012201538 A | 10/2012 |

OTHER PUBLICATIONS

International Search Report (Form PCT/ISA/210) dated Apr. 28, 2015 and issued for PCT/JP2015/058147.
The extended European Search Report based on Application No. 1576411.6 (6 Pages) dated Oct. 24, 2017 (Reference Purpose Only).

\* cited by examiner

FUEL CELL DEVICE

TECHNICAL FIELD

The present invention relates to a fuel cell device.

BACKGROUND ART

In recent years, cell stacks in which a plurality of fuel cells that generate electrical power using a fuel gas (hydrogen-containing gas) and an oxygen-containing gas (air) are connected together have been proposed as next-generation energy sources. Furthermore, various types of fuel cell modules in which a cell stack is housed in a housing container as well as various types of fuel cell devices in which such fuel cell modules are housed in an external case have also been proposed (see Patent Document 1, for example).

One proposed example of such a fuel cell device includes an igniter configured to ignite exhaust gas exhausted from the fuel cells, a combustion catalyst that treats combustion gases after combustion, and a treated exhaust gas temperature sensor configured to measure the temperature of the exhaust gas after being treated by the combustion catalyst, and the like. Here, when the temperature of the treated exhaust gas as measured by the treated exhaust gas temperature sensor is not lower than a prescribed temperature, the igniter is configured to start operation (see Patent Document 2, for example).

CITATION LIST

Patent Literature

Patent Document 1: Japanese Unexamined Patent Application Publication No. 2007-59377A
Patent Document 2: Japanese Unexamined Patent Application Publication No. 2010-153064A

SUMMARY OF INVENTION

Technical Problem

However, in this type of fuel cell device, when the power required by an external load decreases, the amount of fuel gas supplied to the device is also decreased, which can potentially cause the flame for igniting the exhaust gas to go out (flameout).

When flameout occurs, the fuel gas that is not used for power generation in the fuel cells becomes incompletely combusted, which results in an increased rate of combustion reaction in the combustion catalyst and can cause the combustion catalyst to deteriorate. This can also cause the temperature of the fuel cells to decrease, which can result in insufficient power output. Therefore, there is strong demand for a means by which to efficiently re-ignite the flame when it is determined that flameout has occurred.

The present invention therefore aims to provide a fuel cell device that makes it possible to efficiently re-ignite the flame when flameout occurs in the fuel cells.

Solution to Problem

A fuel cell device according to the present invention includes: a fuel cell configured to generate power supplied to an external load with a fuel gas and an oxygen-containing gas; a fuel gas supply device configured to supply the fuel gas to the fuel cell; an oxygen-containing gas supply device configured to supply the oxygen-containing gas to the fuel cell; a combustor configured to combust the fuel gas not used for power generation and wasted from the fuel cell; an igniter configured to combust the fuel gas not used for power generation and wasted from the fuel cell; and a controller configured to control operation of the fuel gas supply device, the oxygen-containing gas supply device, and the igniter. The controller is configured to allow the fuel gas supply device and the oxygen-containing gas supply device to change supply amounts of the fuel gas and the oxygen-containing gas in accordance with changes in power as required by the external load. The controller is further configured to allow the fuel gas supply device and the oxygen-containing gas supply device to supply the fuel gas and the oxygen-containing gas supplied to the fuel cell in a supply amount less than a supply amount to be set in accordance with a decreased power as required by the external load as well as to cause the igniter to start operation if the power required by the external load decreases and flameout of the combustion in combustor is recognized.

Advantageous Effects of Invention

The fuel cell device according to the present invention makes it possible to efficiently re-ignite the combustion flame if that flame goes out.

DESCRIPTION OF EMBODIMENTS

Figure 1:
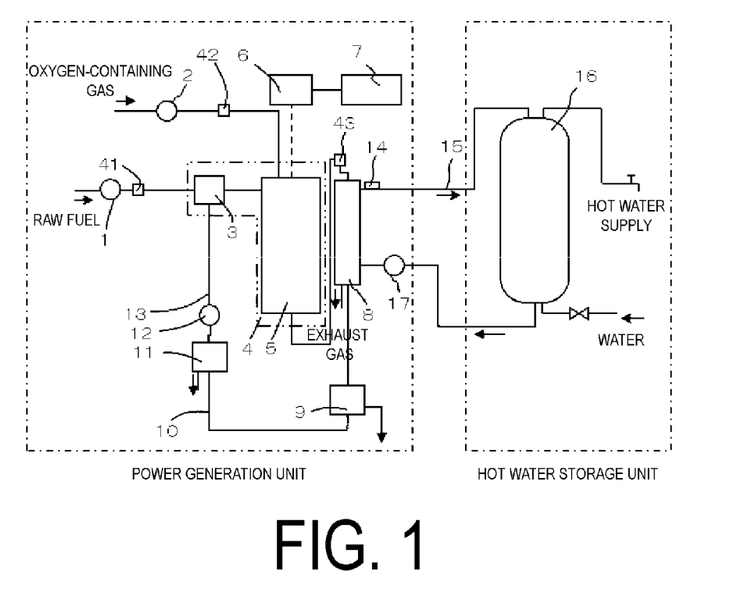
FIG. 1 is a configuration diagram illustrating an example of a configuration of a fuel cell system including a fuel cell device according to an embodiment of the present invention.

FIG. 1 is a configuration diagram illustrating an example of a configuration of a fuel cell system including a fuel cell device according to an embodiment of the present invention. The fuel cell system illustrated in FIG. 1 includes a power generation unit which is an example of the fuel cell device according to the present embodiment, a hot water storage unit configured to store hot water after a heat exchange process, and circulation pipes for circulating water between these units. Note that in the following description, the same reference characters will be used for components that are the same in the figures.

The power generation unit illustrated in FIG. 1 includes: a cell stack 5 in which a plurality of solid oxide fuel cells that each include a fuel electrode layer, a solid electrolyte layer, and an oxygen electrode layer are connected together; a raw fuel supply line that includes a raw fuel supply pump 1, which is a fuel gas supply device configured to supply a raw fuel such as city gas to a reformer 3 (described later); an oxygen-containing gas supply line that includes an oxygen-containing gas supply pump (blower) 2, which is an oxygen-containing gas supply device configured to supply an oxygen-containing gas to the fuel cells of the cell stack 5; and the reformer 3 configured to steam-reform the raw fuel using the raw fuel and steam. The raw fuel supply line includes a raw fuel flowmeter 41 configured to measure the amount of raw fuel supplied by the raw fuel supply pump 1, and the oxygen-containing gas supply line includes an oxygen-containing gas flowmeter 42 configured to measure the amount of oxygen-containing gas supplied by the oxygen-containing gas supply pump 2.

Moreover, the power generation unit illustrated in FIG. 1 includes a fuel cell module 4 (hereinafter, simply "module") formed by housing the cell stack 5 and the reformer 3 in a housing container. In FIG. 1, the fuel cell module 4 is the portion surrounded by the two-dot chain line. Furthermore, an exhaust gas line configured to allow exhaust gas to be exhausted from the cell stack 5 that was not used for power generation includes a purifier 43 including a combustion catalyst for purifying the exhaust gas as well as an igniter (such as an ignition heater; not illustrated in FIG. 1) configured to combust the fuel gas that was not used for power generation in the module 4.

The power generation unit illustrated in FIG. 1 also includes: a circulation pipe 15 that allows water to be circulated through a heat exchanger 8, which exchanges heat between the water and the exhaust gas (exhaust heat) produced as the fuel cells in the cell stack 5 generate power; a water treatment device 9 configured to treat the condensed water produced by the heat exchanger 8 to produce pure water; and a water tank 11 configured to store the water (pure water) treated by the water treatment device 9. The water tank 11 is connected to the heat exchanger 8 by a condensed water supply pipe 10. Moreover, an ion-exchange resin device that includes an ion-exchange resin is preferably used as the water treatment device 9.

The water stored in the water tank 11 is supplied to the reformer 3 by a water pump 12 disposed in a water supply pipe 13 connecting the water tank 11 and the reformer 3.

Furthermore, the power generation unit illustrated in FIG. 1 includes: a supply power adjusting unit (power conditioner) 6 configured to convert the DC power generated by the module 4 to AC power and adjust the amount of the converted electricity supplied to an external load; an outlet water temperature sensor 14 arranged at the outlet of the heat exchanger 8 and configured to measure the temperature of the water (circulated water) flowing through the outlet of the heat exchanger 8; a controller 7 (described later) configured to control operation of each component; and a circulation pump 17 configured to circulate water through the circulation pipe 15.

The controller 7 includes a microcomputer which includes an input/output interface, a CPU, RAM, and ROM. The CPU executes programs for operating the fuel cell device, the RAM temporarily stores variables needed to execute the programs, and the ROM stores the programs.

Furthermore, housing all of the components of the power generation unit within an external case makes it possible to make the fuel cell device easy to transport, install, and the like. In addition, the hot water storage unit includes a hot water storage tank 16 configured to store the hot water after the heat exchange process. Note also that the circulation pump 17 may alternatively be arranged on the hot water storage unit side.

Next, a method of operating the fuel cell system illustrated in FIG. 1 will be described.

In order to produce the fuel gas needed for the cell stack 5 to generate power, the controller 7 causes the raw fuel supply pump 1 and the water pump 12 to start operation. This supplies raw fuel (natural gas, kerosene, or the like) and water to the reformer 3. The reformer 3 performs a steam reforming process to produce a hydrogen-containing fuel gas, which is then supplied to the fuel electrode layers of the fuel cells.

Meanwhile, the controller 7 activates the oxygen-containing gas supply pump 2 to supply an oxygen-containing gas (air) to the oxygen electrode layers of the fuel cells.

Furthermore, the controller 7 causes the igniter (not illustrated in the figure) of the module 4 to start operation in order to combust any fuel gas that was not used for power generation in the cell stack 5. This increases the temperature inside the module (that is, the temperature of the cell stack 5 and the reformer 3), thereby making it possible to generate power efficiently.

Exhaust gas produced as the cell stack 5 generates power is purified by the purifier 43 including a combustion catalyst and is then supplied to the heat exchanger 8, where the exhaust gas exchanges heat with the water flowing through the circulation pipe 15. The hot water produced by the heat exchange process within the heat exchanger 8 flows through the circulation pipe 15 and is then stored in the hot water storage tank 16. Meanwhile, the heat exchange process within the heat exchanger 8 causes the water contained in the exhaust gas exhausted from the cell stack 5 to condense, and this condensed water is supplied to the water treatment device 9 via the condensed water supply pipe 10. The condensed water is purified into pure water in the water treatment device 9 and then supplied to the water tank 11. The water stored in the water tank 11 is then supplied by the water pump 12 to the reformer 3 via the water supply pipe 13. In this way, the condensed water is utilized effectively, thereby making it possible for the device to operate in a self-sustaining manner in terms of the water used.

In the example described above, an example of the configuration of a fuel cell system that includes a hot water storage unit is described. However, the present invention may also be implemented as a so-called mono-generation system that does not include a hot water storage unit. In this case, in order to produce the condensed water, the configuration may include a radiator, and the exhaust gas may be cooled using the radiator in order to produce the condensed water.

In the example of the fuel cell device described above, only the condensed water produced by the heat exchanger 8 is supplied to the reformer 3. However, tap water may also be used for the water supplied to the reformer 3. In this case, components such as an activated carbon filter, a reverse osmosis membrane device, and an ion-exchange resin device may be connected in that order to act as a water treatment device for removing any impurities contained in the tap water, thereby making it possible to efficiently produce pure water. Moreover, when using tap water, the components of the device are still connected with the pure water produced by the water treatment device being stored in the water tank 11.

Figure 2:
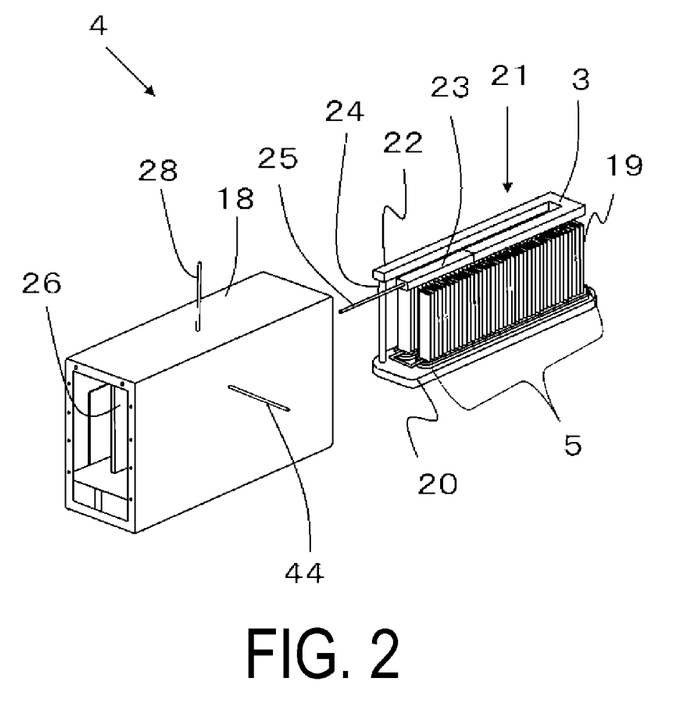
FIG. 2 is an exterior perspective view illustrating an example of a fuel cell module included in the fuel cell system illustrated in FIG. 1.
Figure 3:
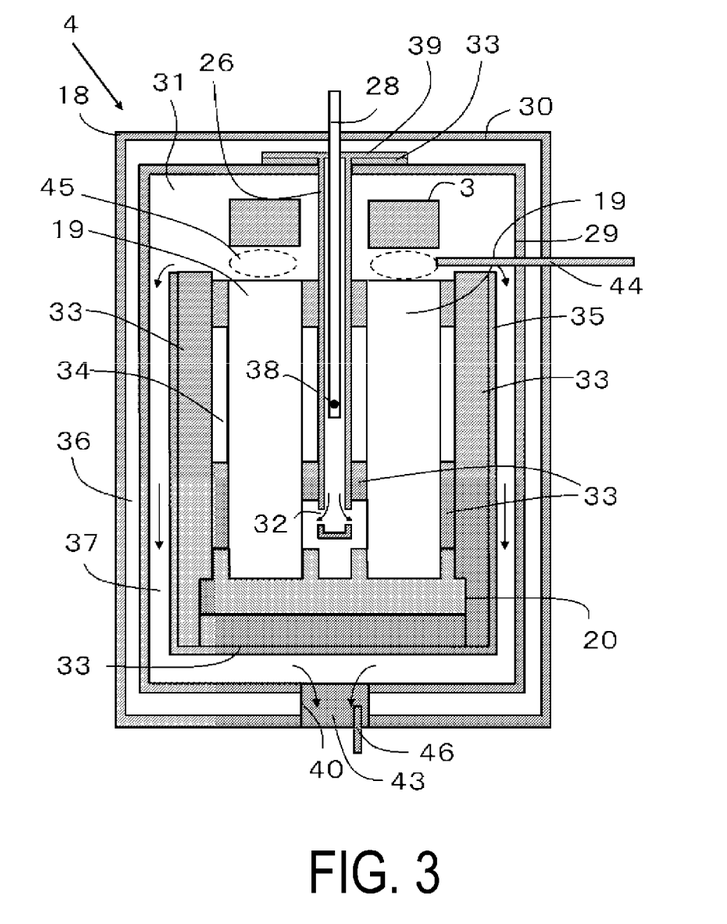
FIG. 3 is a cross-sectional view of the fuel cell module illustrated in FIG. 2.

Next, an example of the module 4 illustrated in FIG. 1 will be described. FIGS. 2 and 3 illustrate this example of the module 4 included in the fuel cell device according to the present embodiment. FIG. 2 is an exterior perspective view of the module 4, and FIG. 3 is a cross-sectional view of the module 4 illustrated in FIG. 2. Note that although FIGS. 2 and 3 illustrate a cell stack device that includes two of the cell stacks 5, the number of cell stacks 5 may be changed as appropriate, and the shape of the housing container may also be changed as appropriate according to the number of cell stacks 5.

In the module 4 illustrated in FIG. 2, a cell stack device 21 including two of the cell stacks 5 is housed inside of a housing container 18. Each cell stack 5 includes column-shaped fuel cells 19 including gas flow paths (not illustrated in the figure) through which the fuel gas flows and are arranged in an upright manner in a line. The adjacent fuel cells 19 are electrically connected to one another in series via current collectors (not illustrated in the figure), and the bottom ends of the fuel cells 19 are fixed to a manifold 20 using an electrically insulating bonding material (not illustrated in the figure) such as a glass sealing material. Moreover, electrically conductive members (not illustrated in the figure) are arranged at both ends of the cell stacks 5. Each electrically conductive member includes an electricity drawing unit for collecting the electricity generated by the cell stacks 5 (the fuel cells 19) and extracting that electricity to outside of the device. Moreover, a thermocouple 28 (a temperature measuring unit) configured to measure the temperature inside the module 4 is provided on the housing container 18.

The examples of the fuel cells 19 illustrated in FIG. 2 are hollow flat plate-shaped fuel cells each including gas flow passages that allow the fuel gas to flow through the fuel cells 19 in the lengthwise direction thereof. The fuel cells 19 are solid oxide fuel cells that each include a support body also including gas flow passages as well as a fuel electrode layer, a solid electrolyte layer, and an oxygen electrode layer layered in that order on the surface of the support body. Alternatively, the fuel cells 19 may have a shape including gas flow passages that allow the oxygen-containing gas to flow through the fuel cells 19 in the lengthwise direction thereof. In this case, the oxygen electrode layer, the solid electrolyte layer, and the fuel electrode layer are layered in that order from the inner side, and the configuration of the module 4 may be modified as appropriate. Furthermore, the shape used for the fuel cells is not limited to a hollow flat plate shape. A flat plate shape or a cylindrical shape may be used instead, for example, and in this case, it is preferable that the shape of the housing container 18 be modified as appropriate.

Moreover, in the module 4 illustrated in FIG. 2, in order to obtain the fuel gas needed for the fuel cells 19 to generate power, the reformer 3 is arranged above the cell stacks 5 and produces the fuel gas by reforming a raw fuel such as city gas that is supplied via a raw fuel supply pipe 25. Here, the reformer 3 may be configured to be able to reform the raw fuel using steam reforming, which is a very efficient reforming reaction. The reformer 3 includes a vaporizer 23 configured to vaporize water and a reforming unit 22 that includes a reforming catalyst (not illustrated in the figure) for reforming the raw fuel into fuel gas.

Furthermore, the fuel gas (hydrogen-containing gas) produced by the reformer 3 is supplied to the manifold 20 via a fuel gas pipe 24 and is then supplied from the manifold 20 to the gas flow passages formed in the fuel cells 19. Moreover, it should be noted that the configuration of the cell stack device 21 may be modified as appropriate in terms of the type and shape of fuel cells 19 used. For example, the cell stack device 21 may include the reformer 3.

Note that FIG. 2 illustrates a state in which portions (the front and rear surfaces) of the housing container 18 are removed and the cell stack device 21 housed thereinside is extracted in the rearward direction. Here, in the module 4 illustrated in FIG. 2, the cell stack device 21 can be slid and housed in the housing container 18.

Furthermore, inside the housing container 18, a reactant gas introduction member 26 is arranged between the cell stacks 5 arranged next to one another on the manifold 20, thereby allowing the oxygen-containing gas to flow alongside the fuel cells 19 from the bottom ends to the top ends thereof.

As illustrated in FIG. 3, the housing container 18 of the module 4 has a two-layer structure including an inner wall 29 and an outer wall 30. The outer wall 30 forms the outer frame of the housing container 18, and the inner wall 29 forms a power generation chamber 31 that houses the cell stack device 21. Furthermore, in the housing container 18, the space between the inner wall 29 and the outer wall 30 forms a reactant gas flow path 36, which guides the oxygen-containing gas supplied from the bottom of the module 4 towards the fuel cells 19. More specifically, the oxygen-containing gas is supplied via an oxygen-containing gas supply port (not illustrated in the figure) formed at the bottom of the module 4 and then flows along the reactant gas flow path 36.

Here, the reactant gas introduction member 26 is inserted through the inner wall 29 and fixed in place inside the housing container 18. The reactant gas introduction member 26 includes, at the top end thereof, a flange 39 and an oxygen-containing gas inflow opening (not illustrated in the figure) for bringing in oxygen-containing gas from the top of the housing container 18. The reactant gas introduction member 26 also includes, at the bottom end thereof, reactant gas outflow openings 32 that introduce the oxygen-containing gas to the bottom ends of the fuel cells 19. Moreover, a thermal insulating member 33 is arranged between each flange 39 and the inner wall 29.

Note that in FIG. 3, the reactant gas introduction member 26 is arranged at a position between the two cell stacks 5 arranged next to one another inside the housing container 18. However, the reactant gas introduction member 26 may be arranged as appropriate according to the number of cell stacks 5. For example, if just a single cell stack 5 is housed inside of the housing container 18, two of the reactant gas introduction members 26 may be provided and arranged sandwiching the cell stack 5 from both side face sides thereof.

Furthermore, in the module 4, an igniter 44 configured to ignite any fuel gas that was not used for power generation in the fuel cells 19, that is, fuel gas that simply passed straight through the fuel cells 19, is inserted through the side face of the housing container 18 to a position between the fuel cells 19 and the reformer 3. Using the igniter 44 to ignite this fuel gas that passed straight through the fuel cells 19 makes it possible to increase the temperature inside the module 4 to a high temperature as well as maintain the temperature of the fuel cells 19 and the reformer 3 at a high temperature. Moreover, in the present configuration, the space between the fuel cell 19 and the reformer 3 forms a combustor 45, indicated by the dashed lines in FIG. 3.

Inside the power generation chamber 31, thermal insulating members 33 for maintaining the temperature inside the module 4 at a high temperature are formed as appropriate to prevent a large amount of the heat inside the module 4 from being radiated away, which would cause the temperature of the fuel cells 19 (the cell stacks 5) to decrease and thereby cause the power output to decrease.

The thermal insulating members 33 are preferably arranged in the vicinity of the cell stacks 5. Particularly, the thermal insulating members 33 are preferably arranged on the side surfaces of the cell stacks 5 extending in the direction in which the fuel cells 19 are arranged and have a width no less than the width of the side surfaces of the cell stacks 5 in the direction in which the fuel cells 19 are arranged. The thermal insulating members 33 are preferably arranged on both side surface sides of the cell stacks 5. This configuration makes it possible to effectively inhibit temperature decreases in the cell stacks 5. Furthermore, this configuration makes it possible to reduce the amount of oxygen-containing gas guided in by the reactant gas introduction member 26 that gets exhausted from the side face sides of the cell stacks 5, thereby making it possible to promote the flow of the oxygen-containing gas between the fuel cells 19 of the cell stacks 5. Note that openings 34 are defined in the thermal insulating members 33 arranged on both side surface sides of the cell stacks 5 in order to regulate the flow of oxygen-containing gas to the fuel cells 19 and to decrease the differences in temperature in the lengthwise direction in which the cell stacks 5 extend as well as in the direction in which the fuel cells 19 are stacked. Here, a plurality of the thermal insulating members 33 may be used in combination to define the openings 34.

Moreover, on the inner sides of the inner walls 29 extending in the direction in which the fuel cells 19 are arranged, exhaust gas inner walls 35 are formed. The space between the inner walls 29 and the exhaust gas inner walls 35 forms exhaust gas flow paths 37 that allow the exhaust gas inside the power generation chamber 31 to flow from top to bottom. Furthermore, the exhaust gas flow paths 37 are communicated to an exhaust hole 40 formed at the bottom of the housing container 18. Further, the thermal insulating members 33 are disposed on the cell stack 5 side of the exhaust gas inner walls 35 as well.

In this way, exhaust gas produced as the module 4 is operating flows through the exhaust gas flow path 37 and is then exhausted through the exhaust hole 40. Note that the exhaust hole 40 may be formed by cutting out a portion of the bottom of the housing container 18 or by using a pipe-shaped member.

The fuel cell device according to the present embodiment includes the purifier 43, which is arranged between the module 4 and the heat exchanger 8 and includes a combustion catalyst for purifying the exhaust gas exhausted from the cell stacks 5 (the module 4). This purifier 43 makes it possible to purify the exhaust gas exhausted from the module 4 and then exhaust the purified exhaust gas to outside of the fuel cell device. FIG. 3 illustrates an example in which the purifier 43 is arranged inside of the exhaust hole 40, but the purifier 43 may be arranged anywhere between the module 4 and the heat exchanger 8. Furthermore, the purifier 43 includes a temperature sensor 46 configured to measure the temperature of the combustion catalyst.

A catalyst formed by affixing a noble metal such as platinum or palladium or a metal such as manganese, cobalt, silver, copper, or nickel to a conventionally well-known porous support material may be used for the combustion catalyst.

When conventionally well-known hollow flat-plate shaped fuel cells are used for the fuel cells 19 of the present embodiment, each fuel cell 19 is a column-shaped (a hollow flat plate-shaped) member that includes a column-shaped electrically conductive supporting substrate (hereinafter, simply "supporting substrate") having a pair of flat surfaces facing one another, as well as a fuel electrode layer, a solid electrolyte layer, and an oxygen electrode layer layered in that order on one of the flat surfaces. Moreover, an interconnector is disposed on the other flat surface of each fuel cell 19, and a p-type semiconductor layer is disposed on the outer (upper) surface of the interconnector. The p-type semiconductor layer connects the interconnector to a current collector, forming an ohmic contact therebetween and making it possible to reduce the voltage drop thereacross as well as to effectively avoid decreases in current collection performance. Furthermore, on a premise that the supporting substrate doubles as the fuel electrode layer, the fuel cell may be formed by the solid electrolyte layer and the oxygen electrode layer being stacked on the surface of the supporting substrate.

The fuel electrode layer may be made from a conventionally well-known material such as a porous electrically conductive ceramic. For example, the fuel electrode layer is made from $ZrO_2$ in which a rare earth oxide is solid-dissolved (known as stabilized zirconia, which also includes partially stabilized zirconia) and Ni and/or NiO.

The solid electrolyte layer must function as an electrolyte that allows electrons to move between the fuel electrode layer and the oxygen electrode layer and as a gas barrier that prevents fuel gas and oxygen-containing gas leaks. The solid electrolyte layer is therefore made from a solid solution of $ZrO_2$ containing from 3 to 15 mol % of a rare earth oxide. Note that the solid electrolyte layer 34 may be formed of another material as long as that material exhibits the above-mentioned properties.

The material used for the oxygen electrode layer is not particularly limited, and any conventionally well-known material may be used. For example, the oxygen electrode layer may be made from an electrically conductive ceramic made from a so-called $ABO_3$ perovskite oxide. The oxygen electrode layer must be gas permeable. It is preferable that the open porosity of the oxygen electrode layer be no less than 20% and particularly preferable that the open porosity be in the range of 30 to 50%.

The supporting substrate must be gas permeable to allow the fuel gas to permeate through to the fuel electrode layer and must also be electrically conductive in order to allow current collection via the interconnector. Therefore, a material such as an electrically conductive ceramic or cermet may be used for the supporting substrate. During production of the fuel cells 19, if the supporting substrate is produced at the same time as the fuel electrode layer or the solid electrolyte layer using a sintering process, it is preferable that the supporting substrate be made from an iron group metal and a prescribed rare earth oxide. Furthermore, to ensure gas permeability, it is preferable that the supporting substrate have an open porosity of no less than 30% and particularly preferable that the open porosity be in the range of 35% to 50%. It is also preferable that the supporting substrate have an electrical conductivity of no less than 300 S/cm, and particularly preferable that the electrical conductivity no less than 440 S/cm. In addition, the supporting substrate may be cylinder-shaped as long as the overall columnar shape is retained.

The p-type semiconductor layer may be made from a perovskite transition metal oxide layer, for example. More specifically, a material that has a greater electron conductivity than the material used for the interconnector may be used, such as a p-type semiconductor ceramic made from at least one of an $LaMnO_3$ oxide, an $LaFeO_3$ oxide, or an $LaCoO_3$ oxide that has Mn, Fe, Co, or the like at the B site, for example. It is generally preferable that the thickness of this p-type semiconductor layer be in the range of 30 to 100 μm.

A material such as a lanthanum chromite perovskite oxide (an $LaCrO_3$ oxide) or a lanthanum strontium titanium perovskite oxide (an $LaSrTiO_3$ oxide) may be preferably used for the interconnector as described above. These materials have electrically conductive property and do not reduce or oxidize when in contact with the fuel gas (a hydrogen-containing gas) or the oxygen-containing gas (air or the like). Moreover, the interconnector must be made from a high-density material in order to prevent leaks of the fuel gas flowing through the gas flow paths formed in the supporting substrate as well as leaks of the oxygen-containing gas flowing outside of the supporting substrate. It is preferable that the interconnector have a relative density of no less than 93% and particularly preferable that the relative density be no less than 95%.

Figure 4:
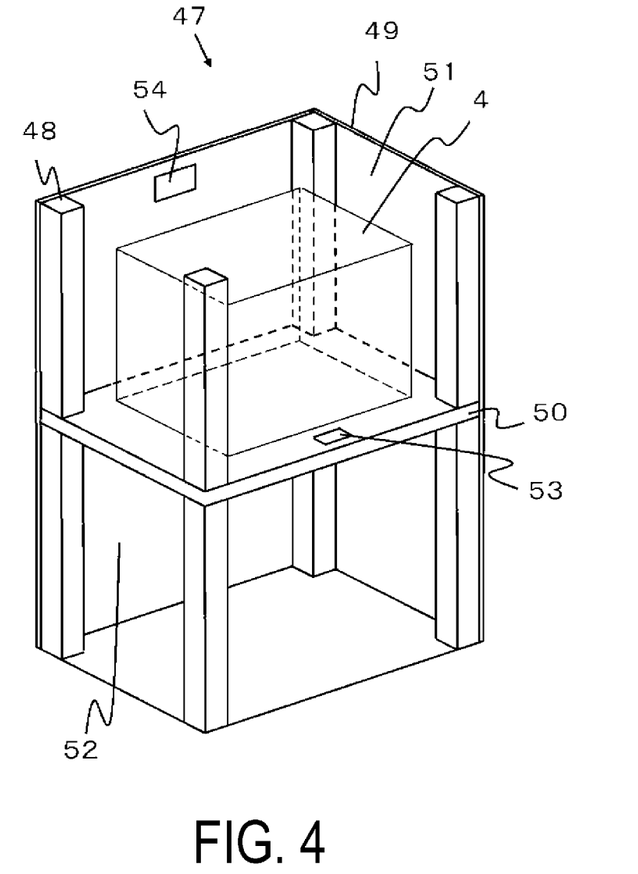
FIG. 4 is an exploded perspective view schematically illustrating an example of a fuel cell device according to an embodiment of the present invention.

FIG. 4 is an exploded perspective view illustrating an example of a fuel cell device according to the present embodiment, in which the module 4 illustrated in FIG. 2, an auxiliary device (not illustrated in the figure) configured to operate the module 4 are housed inside an external case. Note that some of the components of the configuration are not illustrated in FIG. 4.

In the fuel cell device 47 illustrated in FIG. 4, an external case formed using supporters 48 and exterior plates 49 is divided into an upper and a lower region using a dividing plate 50. The upper region forms a module housing chamber 51 that houses the module 4. The lower region forms an auxiliary device housing chamber 52 that houses the auxiliary device configured to operate the module 4. Note that the auxiliary device housed in the auxiliary device housing chamber 52 is not illustrated in FIG. 12.

Furthermore, an airflow hole 53 for allowing air in the auxiliary device housing chamber 52 to flow into the module housing chamber 51 is formed in the dividing plate 50, and an exhaust hole 54 for exhausting air out of the module housing chamber 51 is formed in one of the exterior plates 49 of the module housing chamber 51.

High power generation efficiency is required for this type of fuel cell device. Therefore, the controller 7 is configured to allow the raw fuel supply pump 1 and the oxygen-containing gas supply pump 2 to change the supply amounts of the fuel gas and the oxygen-containing gas that the fuel cells 19 need to generate power in accordance with changes in the power as required by the external load (hereinafter, simply "external load"). In other words, the controller 7 implements a partial load-following control scheme.

Therefore, when the required external load decreases, for example, the controller 7 reduces the amounts of the fuel gas and the oxygen-containing gas supplied by the raw fuel supply pump 1 and the oxygen-containing gas supply pump 2 to the supply amounts in accordance with the decreased external load. However, this reduces the amount of fuel gas exhausted from the fuel cells 19, which can potentially cause the combustion in the combustor 45 to stop due to flameout.

When flameout occurs in the combustor 45, the fuel gas that was not used for power generation in the fuel cells 19 becomes incompletely combusted, which can result in an increased rate of combustion reaction in the combustion catalyst and deterioration of the combustion catalyst or a decrease in the temperature of the fuel cells 19 and insufficient power output. As a result, there is strong demand for a means that makes it possible to efficiently re-ignite the flame when it is determined that flameout has occurred.

Therefore, in the fuel cell device according to the present embodiment, if the power as required by the external load decreases and flameout of the combustion in the combustor 45 is recognized, the controller 7 causes the fuel gas supply device and the oxygen-containing gas supply device to supply the fuel gas and the oxygen-containing gas supplied to the fuel cells 19 in a supply amount less than an supply amount to be set in accordance with a decreased power as required by the external load. This makes it possible to efficiently re-ignite the flame in the combustor 45.

Furthermore, the method used to determine whether combustion has stopped in the combustor 45 due to flameout may be selected as appropriate according to the configuration of the fuel cell device. For example, this determination may be made on the basis of the temperature measured by the temperature sensor 46 configured to measure the temperature of the combustion catalyst, by providing a temperature sensor in the combustor 45 and making the determination on the basis of the temperature measured by this temperature sensor, by making the determination on the basis of the temperature inside the module 4 as measured by the thermocouple 28, which is a temperature measuring unit, configured to measure the temperature inside the module 4, or the like. The following description assumes an example in which the determination is made on the basis of the temperature measured by the temperature sensor 46 configured to measure the temperature of the combustion catalyst.

Moreover, when setting the supply amounts of the fuel gas and the oxygen-containing gas supplied to the fuel cells 19 to less than the supply amounts to be set in accordance with the decreased power as required by the external load, the amounts set are not particularly limited as long as those amounts are less than the supply amounts to be set in accordance with the decreased power as required by the external load. For example, the amounts may be set to the minimum flow rates required to maintain the minimum temperature that makes it possible to immediately generate power. The following description assumes an example in which these minimum flow rates are used.

Figure 5:
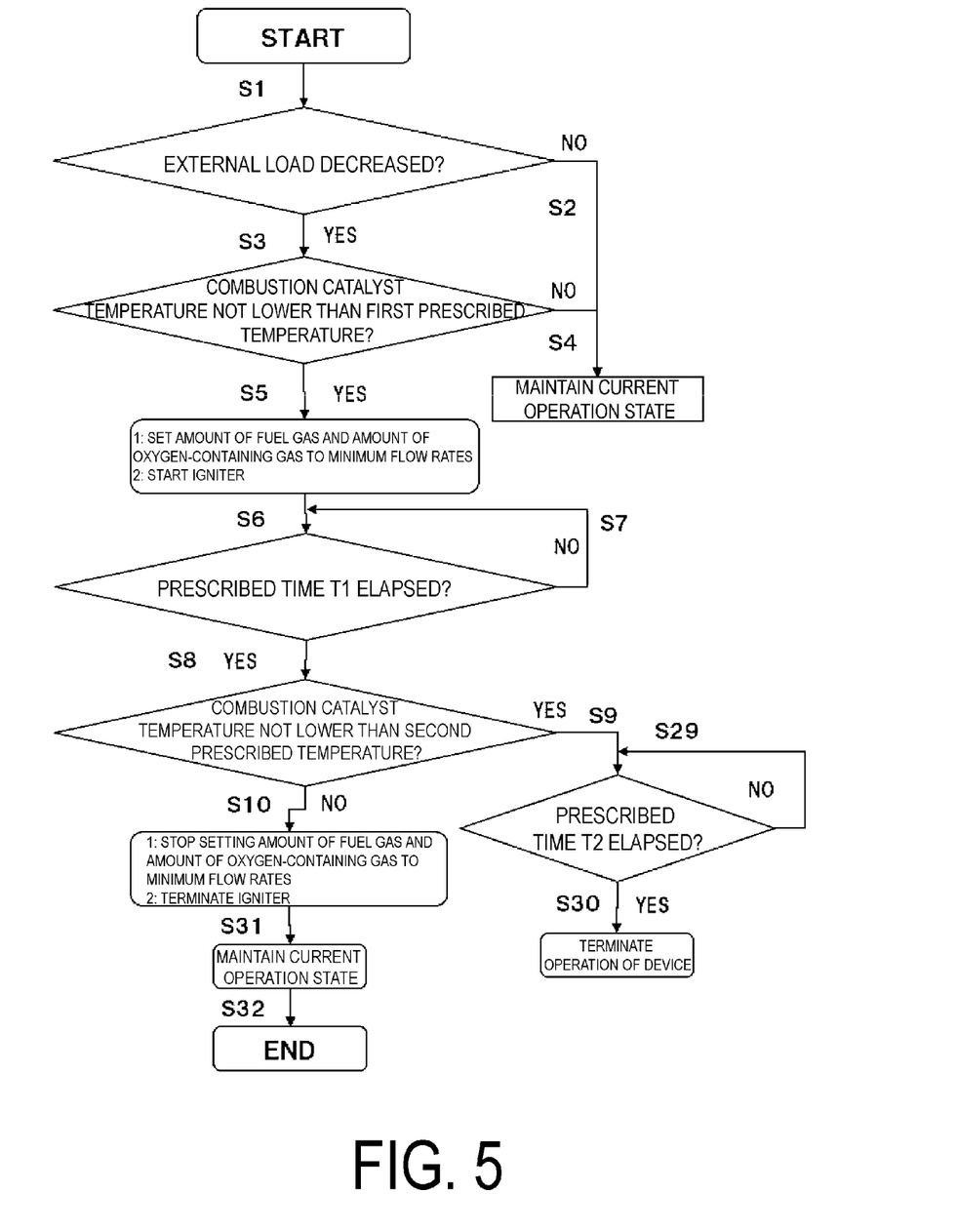
FIG. 5 is a flowchart illustrating a portion of an example of an operational control scheme for the fuel cell device according to the embodiment of the present invention.

FIG. 5 is a flowchart illustrating an example of an operational control scheme for the module 4 (fuel cell device) according to the present embodiment. Next, the operational control scheme will be described with reference to the flowchart illustrated in this figure.

First, in step S1, the controller 7 determines whether the external load has decreased. If the external load has not decreased, the controller 7 proceeds to step S2 and maintains the current operation state. Here, the condition used to determine whether the external load has decreased may be set as appropriate. For example, a decrease of 50% or greater in the external load relative to the external load from before the process illustrated in the flowchart was started may be used as this condition. Moreover, the external load may be determined on the basis of a value from the supply power adjusting unit 6.

When the controller 7 determines that the external load has decreased, the controller 7 proceeds to step S3 and determines whether the temperature of the combustion catalyst as measured by the temperature sensor 46 is not lower than a first prescribed temperature. Furthermore, the first prescribed temperature may be set as appropriate according to the type of combustion catalyst used. When using a combustion catalyst in which platinum is affixed to a porous support material, for example, the first prescribed temperature may be set as appropriate in the range of 300 to 400° C.

Here, if the temperature of the combustion catalyst is lower than the first prescribed temperature, it can be determined that flameout has not occurred, and the controller 7 proceeds to step S4 and maintains the current operation state.

Meanwhile, if temperature of the combustion catalyst is not lower than the first prescribed temperature, the controller 7 determines that flameout has occurred and proceeds to step S5, which is the re-ignition step.

In step S5, the controller 7 causes the raw fuel supply pump 1 and the oxygen-containing gas supply pump 2 to set the amount of fuel gas and the amount of oxygen-containing gas to the minimum flow rates. The controller 7 also causes the igniter 44 to start operation.

Here, when the temperature of the combustion catalyst is not lower than the first prescribed temperature, this means that there is a large amount of exhaust gas that is not combusting in the combustor 45. When this happens, for an unknown reason, the flame sometimes cannot easily be ignited simply by starting operation of the igniter 44.

Therefore, in step S5, the controller 7 causes the raw fuel supply pump 1 and the oxygen-containing gas supply pump 2 to set the amount of fuel gas and the amount of oxygen-containing gas to the minimum flow rates. This makes it possible to reduce the amount of uncombusted exhaust gas, which reduces the increase in temperature in the combustion catalyst, thereby making it possible to inhibit deterioration of the combustion catalyst and easily re-ignite the flame using the igniter 44.

Next, the controller 7 proceeds to step S6 and determines whether a prescribed time T1 has elapsed since the igniter 44 was caused to start operation. Here, the prescribed time T1 may be set as appropriate in the range of 1 to 10 minutes.

If the controller 7 determines that the prescribed time T1 has not elapsed, the controller 7 proceeds to step S7 and thereby returns to step S6 while maintaining the amount of fuel gas and the amount of oxygen-containing gas at the minimum flow rates and the operation of the igniter 44.

Meanwhile, if the controller 7 determines that the prescribed time T1 has elapsed, the controller 7 proceeds to step S8 and determines whether the temperature of the combustion catalyst is lower than the first prescribed temperature but not lower than a second prescribed temperature set lower than the first prescribed temperature. The second prescribed temperature may also be set as appropriate according to the type of combustion catalyst used. When the first prescribed temperature is set to from 300 to 400° C., for example, the second prescribed temperature may be set in the range of 200 to 300° C.

Here, if the controller 7 determines that the temperature of the combustion catalyst is not lower than the second prescribed temperature, the controller 7 proceeds to step S9 while maintaining the amount of fuel gas and the amount of oxygen-containing gas at the minimum flow rates and the operation of the igniter 44 and then determines whether a prescribed time T2 has elapsed. The prescribed time T2 may be defined as the time since proceeding to step S8 and may be set as appropriate in the range of 1 to 10 minutes.

In step S9, if the prescribed time T2 has not elapsed, the controller 7 proceeds to step S29 and thereby returns to step S9 and determines again whether the prescribed time T2 has elapsed.

Meanwhile, if the prescribed time T2 has elapsed in step S9, the controller 7 proceeds to step S30 and stops operation of the fuel cell device because there is a possibility that an abnormality has occurred in the igniter 44 or the like.

Meanwhile, if the temperature of the combustion catalyst is lower than the second prescribed temperature, the controller 7 determines that the flame has been re-ignited and proceeds to step S10. In step S10, the controller 7 stops controlling the operation of the raw fuel supply pump 1 and the oxygen-containing gas supply pump 2 to maintain the amount of fuel gas and the amount of oxygen-containing gas at the minimum flow rates. In other words, the controller 7 controls the operation of the raw fuel supply pump 1 and the oxygen-containing gas supply pump 2 to increase the amount of fuel gas and the amount of oxygen-containing gas supplied to the supply amount in accordance with the external load. The controller 7 also terminates the operation of the igniter 44. The control scheme described above makes it possible to efficiently re-ignite the flame. Moreover, the controller 7 may wait from 1 to 10 minutes after increasing the amount of fuel gas and the amount of oxygen-containing gas to terminate the operation of the igniter 44. Next, the controller 7 proceeds to step S31 and maintains the current operation state and then proceeds to step S32, thereby completing the control scheme illustrated in this flowchart.

Note that in step S10, after the operation of the raw fuel supply pump 1 and the oxygen-containing gas supply pump 2 is controlled to increase the amount of fuel gas and the amount of oxygen-containing gas and the operation of the igniter 44 is terminated, the current required by the external load returns to a state that allows power to be generated within the rated range. Here, however, if the amount of fuel gas and the amount of oxygen-containing gas are increased too quickly, flameout may occur again.

Figure 6:
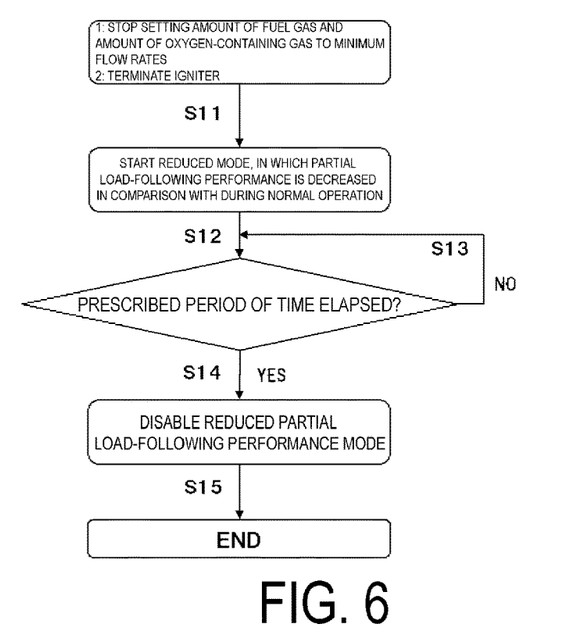
FIG. 6 is a flowchart illustrating an example of a continuation of the flowchart illustrated in FIG. 5.

Therefore, the controller 7 may proceed to step S11 after step S10, as illustrated in the flowchart in FIG. 6, for example. Moreover, the controller 7 may always proceed to step S11 after step S10. In step S11, the controller 7 starts a reduced mode in which the partial load-following performance is decreased in comparison with during normal operation.

Here, it is difficult to instantaneously generate the power required by the external load when the external load increases, and therefore it is preferable that the amount of increased power generated due to the increased power required by the external load be determined in advance during normal operation. However, when the generated power is actually increased by this amount during normal operation, the increase amount tends to be large, which causes a large increase in the amount of fuel gas and the amount of oxygen-containing gas and can thereby cause flameout to occur again.

Therefore, in step S11, the controller 7 starts a reduced mode in which the amount of increased power generated due to the increased power required by the external load is reduced in comparison with during normal operation. This reduced mode reduces the amount of increased power generated, thereby reducing the increase in the amount of fuel gas and the amount of oxygen-containing gas and making it possible to prevent flameout from occurring again. Here, the amount of increased power generated in reduced mode may be set as appropriate in the range of 50 to 70% of the amount of increased power generated during normal operation.

Meanwhile, when the amount of increased power generated due to the increased power required by the external load becomes small, the device can no longer follow the power required by the external load, and the amount by which the device is unable to follow the external load must be purchased from a commercial power source. This can result in an increase in running costs for the user.

Therefore, the controller 7 proceeds to step S12 and determines whether a prescribed period of time has elapsed since a temperature of the combustion catalyst became less than the second prescribed temperature (that is, since reduced mode was started). If this prescribed period of time has not elapsed, the controller 7 proceeds to step S13 and thereby returns to step S12. Here, this prescribed period of time may be set in the range of 1 to 10 minutes since reduced mode is started, for example.

Meanwhile, if the prescribed period of time since a temperature of the combustion catalyst became less than the second prescribed temperature has elapsed, the controller 7 proceeds to step S14, disables reduced mode, and returns the amount of increased power generated to the increase amount used during normal operation. The controller 7 then proceeds to step S15, thereby completing the control scheme illustrated in this flowchart.

This control makes it possible to follow the power required by the external load, thereby making it possible to prevent an increase in running costs for the user.

Meanwhile, if the fuel cells 19 experience deterioration, the power output may decrease, and the amount of exhaust gas exhausted from the fuel cells 19 may increase. When this happens, it may no longer be possible to combust all of the fuel gas in the combustor 45, which can result in an increased rate of combustion reaction in the combustion catalyst and cause an increase in the temperature of the combustion catalyst.

Figure 7:
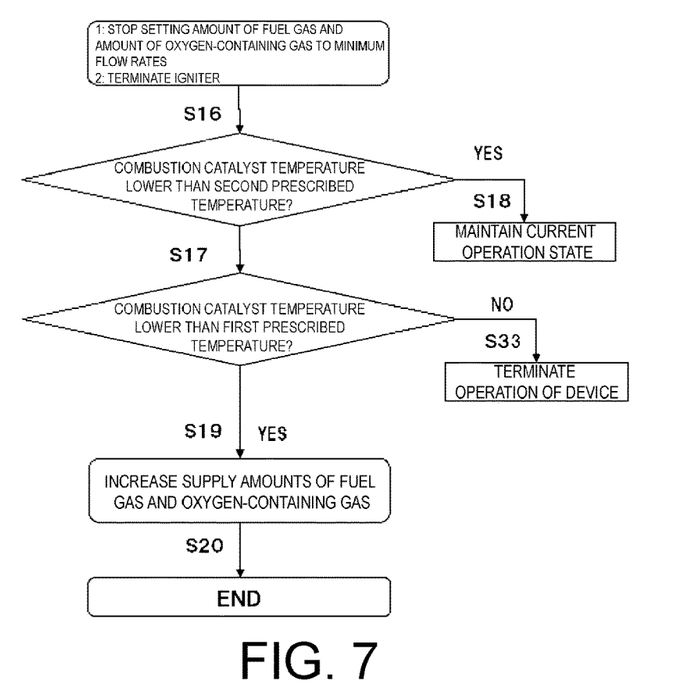
FIG. 7 is a flowchart illustrating another example of a continuation of the flowchart illustrated in FIG. 5.

Therefore, the controller 7 may proceed to step S16 after step S10, as illustrated in the flowchart in FIG. 7.

In step S16, the controller 7 checks whether the temperature of the combustion catalyst as measured by the temperature sensor 46 is lower than the second prescribed temperature. If the temperature of the combustion catalyst is lower than the second prescribed temperature, it is determined that the fuel cells 19 have not experienced deterioration, and the controller 7 proceeds to step S18 and maintains the current operation state.

However, if the temperature measured by the temperature sensor 46 is not lower than the second prescribed temperature, it is determined that the fuel cells 19 have in fact experienced deterioration, and the controller 7 proceeds to step S17.

In step S17, the controller 7 checks whether the temperature of the combustion catalyst as measured by the temperature sensor 46 is less than the first prescribed temperature. If this temperature is not lower than the first prescribed temperature, it is determined that the fuel cells have experienced a high degree of deterioration, and the controller 7 proceeds to step S33 and stops operation of the fuel cell device.

Meanwhile, if in step S17 the temperature of the combustion catalyst as measured by the temperature sensor 46 is lower than the first prescribed temperature, it is determined that the fuel cells 19 have experienced deterioration to a degree within a range in which operation of the fuel cell device can be continued.

In this case, the amount of the fuel gas is increased as necessary to obtain the same power output before and after deterioration of the fuel cells 19. Therefore, in step S17, if the temperature measured by the temperature sensor 46 is lower than the first prescribed temperature, the controller 7 causes the raw fuel supply pump 1 and the oxygen-containing gas supply pump 2 to increase the supply amounts of the fuel gas and the oxygen-containing gas and then proceeds to step S20, thereby completing the control scheme illustrated in this flowchart.

Here, the controller 7 may always proceed to step S16 after step S10. Alternatively, the controller 7 may begin by implementing just the control scheme illustrated in the flowchart in FIG. 5 and then transition to the control scheme in which the controller 7 proceeds to step S16 in the flowchart illustrated in FIG. 7 after step S10 in the flowchart illustrated in FIG. 5 at a later time when the possibility that the fuel cells have experienced deterioration has increased, for example. In this case, a step for determining whether two to five years (this value may be set as appropriate) have elapsed since the fuel cell device was put into service, a step for determining whether flameout has occurred three or more times in a one month period (for example), a step for determining whether flameout has occurred a total of 10 or more times, or the like may be inserted between step S10 and step S16, for example. Then, if the conditions defined in these steps are satisfied, the controller 7 may proceed to step S16. Moreover, information such as the operating time of the fuel cell device to date and the number of flameouts may be stored in the controller 7.

Furthermore, when increasing the amount of fuel gas in step S10, sometimes the flow rate measured by the raw fuel flowmeter 41 may be less than the specified flow rate that the controller 7 instructed the raw fuel supply pump 1 to supply. This can be due to a problem such as deterioration of the raw fuel supply pump 1 and causes the amount of fuel gas supplied to the fuel cells 19 to be less than the amount of fuel gas specified by the controller 7. If this difference is large, flameout may occur again and it may not be possible to achieve the target power output.

Figure 8:
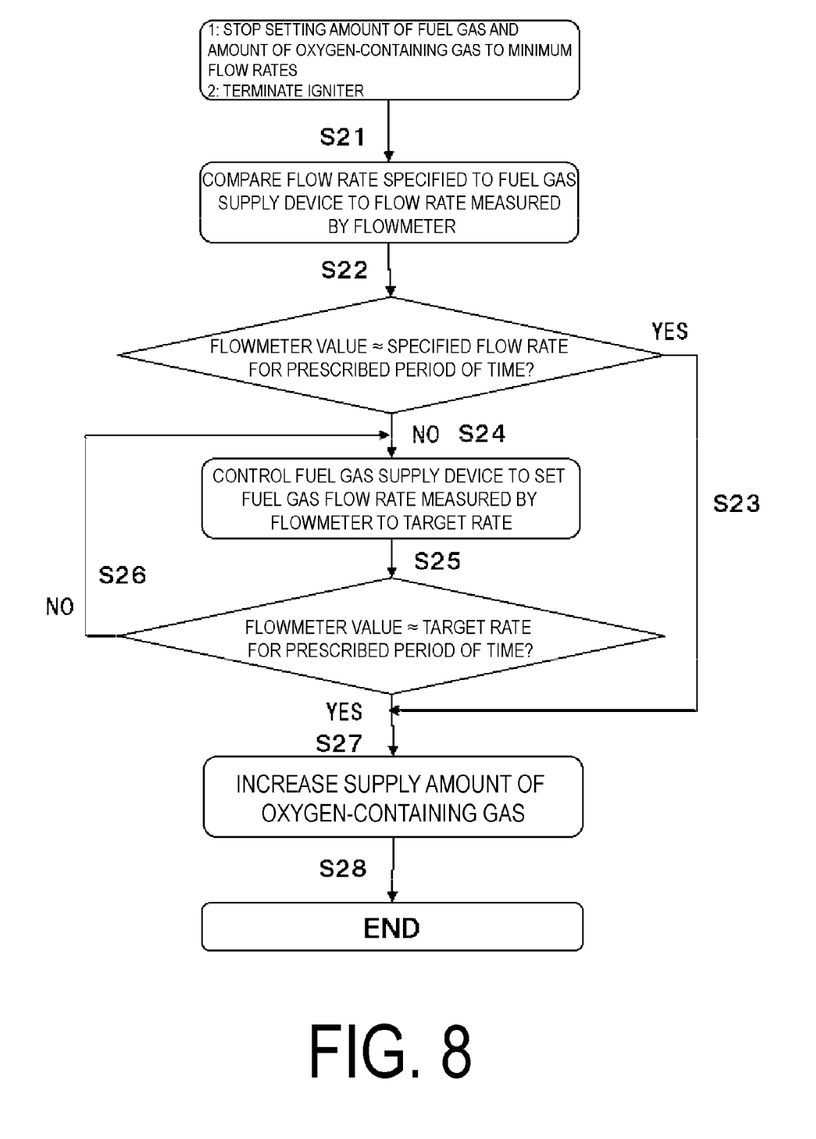
FIG. 8 is a flowchart illustrating yet another example of a continuation of the flowchart illustrated in FIG. 5.

Therefore, the controller 7 may proceed to step S21 after step S10, as illustrated in the flowchart in FIG. 8. In step S21, the specified flow rate that the controller 7 specified to the raw fuel supply pump 1 is compared to the flow rate measured by the raw fuel flowmeter 41.

Next, in step S22, the controller 7 determines whether the value measured by the flowmeter remains equal to the specified flow rate for a prescribed time. Here, the flowmeter value remaining equal to the specified flow rate means that the flowmeter value remains within ±10% of the specified flow rate value. Moreover, the prescribed time may be set as appropriate in the range of 1 to 10 minutes.

In step S22, if the flowmeter value remains equal to the specified flow rate for the prescribed time, it can be determined that the raw fuel supply pump 1 has not experienced any deterioration or the like and can supply any prescribed amount of fuel gas. Therefore, the controller 7 proceeds to step S27 and controls the oxygen-containing gas supply pump 2 to increase the supply amount of the oxygen-containing gas.

Meanwhile, if the flowmeter value does not remain equal to the specified flow rate for the prescribed time in step S22, the controller 7 proceeds to step S24 and causes the raw fuel gas supply pump 1 to increase or decrease the supply amount of fuel gas and to set the flowmeter value equal to the flow rate that the controller 7 originally specified for the raw fuel supply pump 1 to supply to the fuel cells 19 (that is, the initial specified flow rate, which will be referred to as the "target rate" in the following description).

Next, the controller 7 proceeds to step S25 and determines whether the value measured by the flowmeter remains equal to the target rate for a prescribed time. Here, the flowmeter value remaining equal to the target rate means that the flowmeter value remains within ±10% of the target rate value. Moreover, the prescribed time may be set as appropriate in the range of 1 to 10 minutes.

Here, if the flowmeter value does not remain equal to the target rate for the prescribed time, the controller 7 proceeds to step S26 and thereby returns to step S24, where the controller 7 again causes the raw fuel gas supply pump 1 to increase or decrease the supply amount of fuel gas to the target rate specified to the raw fuel supply pump 1.

Meanwhile, if the flowmeter value does remain equal to the target rate for the prescribed time, the controller 7 proceeds to step S27 and causes the oxygen-containing gas supply pump 2 to increase the supply amount of the oxygen-containing gas. The controller 7 then proceeds to step S28, thereby completing the control scheme illustrated in this flowchart.

Here, the controller 7 may always proceed to step S21 after step S10. Alternatively, the controller 7 may begin by implementing just the control scheme illustrated in the flowchart in FIG. 5 and then transition to the control scheme in which the controller 7 proceeds to step S21 in the flowchart illustrated in FIG. 8 after step S10 in the flowchart illustrated in FIG. 5 at a later time when the possibility that the raw fuel supply pump 1 has experienced deterioration has increased. In this case, a step for determining whether two to five years (this value may be set as appropriate) have elapsed since the fuel cell device was put into service, for example, may be inserted between step S10 and step S21. Then, if the condition defined in this step is satisfied, the controller 7 may proceed to step S21. Moreover, information such as the operating time of the fuel cell device to date may be stored in the controller 7.

Implementing this type of control scheme makes it possible to efficiently prevent flameout and prevent decreases in power output.

The present invention has been described in detail above. However, the present invention is not limited to the embodiments described above, and various modifications or improvements can be made without departing from the spirit of the present invention.

For example, in the example described above, whether flameout has occurred in the combustor 45 is determined on the basis of the temperature measured by the temperature sensor 46 configured to measure the temperature of the combustion catalyst. However, this determination may alternatively be made on the basis of the temperature measured by a temperature sensor provided in the combustor 45, for example. In this case, a flameout determination temperature D1 may be set as appropriate in the range of 400 to 550° C., and it may be determined that flameout has occurred when the temperature measured by the temperature sensor provided in the combustor 45 becomes lower than D1. Meanwhile, a temperature for determining whether the flame has been re-ignited may be set to the flameout determination temperature D1+50° C.

Accordingly, in the flowchart illustrated in FIG. 5, the "Combustion catalyst temperature not lower than first prescribed temperature?" step may be replaced with a "Combustion area temperature lower than D1?" step, and the "Combustion catalyst temperature not lower than second prescribed temperature?" step may be replaced with a "Combustion area temperature lower than D1+50° C.?" step.

Similarly, whether flameout has occurred in the combustor 45 may also be determined on the basis of the temperature inside the module 4 as measured by the thermocouple 28, for example. In this case, a flameout determination temperature D2 may be set as appropriate in the range of 500 to 600° C., and it may be determined that flameout has occurred when the temperature measured by the thermocouple 28 becomes lower than D2. Meanwhile, a temperature for determining whether the flame has been re-ignited may be set to the flameout determination temperature D2+20° C.

Accordingly, in the flowchart illustrated in FIG. 5, the "Combustion catalyst temperature not lower than first prescribed temperature?" step may be replaced with a "Temperature measured by thermocouple 28 lower than D2?" step, and the "Combustion catalyst temperature not lower than second prescribed temperature?" step may be replaced with a "Temperature measured by thermocouple 28 less than D2+20° C.?" step.

Moreover, when implementing the control scheme illustrated in the flowchart in FIG. 6, the control schemes illustrated in the flowcharts in FIGS. 7 and 8 for determining whether the fuel cells or the raw fuel supply pump have experienced deterioration may be added between step S10 and step S11. For example, it is preferable that when it is determined that the fuel cells have experienced deterioration, the amount of fuel gas and the amount of oxygen-containing gas supplied in the reduced mode in which the partial load-following performance is decreased in comparison with normal operation be set to values larger than those used when it is determined that the fuel cells have not experienced deterioration.

Moreover, when it is determined that the raw fuel supply pump has experienced deterioration, after checking that the value measured by the flowmeter is equal to the fuel gas target rate, the amount of oxygen-containing gas may be increased and the reduced mode may be started.

Furthermore, in the flowchart illustrated in FIG. 8, when the steps from S24 to S26 are repeated multiple times, for example, it may be determined that an abnormality has occurred in the fuel cell device, and operation of the fuel cell device may be terminated.

In addition, the examples described above employ so-called hollow flat-plate shaped fuel cells for the fuel cells 19. However, horizontal fuel cells in which a plurality of horizontal power generating devices are arranged on a support body may also be used.

REFERENCE SIGNS LIST

1 Raw fuel supply pump
2 Oxygen-containing gas supply pump
3 Reformer
4 Fuel cell module
7 Controller
19 Fuel cell
43 Purifier
44 Igniter
46 Temperature sensor

The invention claimed is:

1. A fuel cell device comprising:
   a fuel cell configured to generate power using a fuel gas and an oxygen-containing gas, the power supplied to an external load;
   a fuel gas supply device configured to supply the fuel gas to the fuel cell;
   an oxygen-containing gas supply device configured to supply the oxygen-containing gas to the fuel cell;
   a combusted space where the fuel gas not used for power generation and wasted from the fuel cell is combusted;
   an igniter configured to combust the fuel gas not used for power generation and wasted from the fuel cell; and
   a controller configured to control operation of the fuel gas supply device, the oxygen-containing gas supply device, and the igniter,
   wherein the controller is configured to allow the fuel gas supply device and the oxygen-containing gas supply device to change supply amounts of the fuel gas and the oxygen-containing gas in accordance with changes in power as required by the external load, and wherein the controller is further configured to allow the fuel gas supply device and the oxygen-containing gas device to supply the fuel gas and the oxygen-containing gas supplied to the fuel cell in a decreased supply amount less than a supply amount to be set in accordance with a decreased power as required by the external load, and configured to cause the igniter to start operation if the power required by the external load decreases and flameout of the combustion in the combusted space is recognized.

2. The fuel cell device according to claim 1, further comprising:
a combustion catalyst that treats exhaust gas exhausted through the combusted space; and
a temperature sensor configured to measure a temperature of the combustion catalyst;
wherein the controller is further configured to allow the fuel gas supply device and the oxygen-containing gas device to supply the fuel gas and the oxygen-containing gas supplied to the fuel cell in the decreased supply amount less than the supply amount to be set in accordance with the decreased power as required by the external load, and configured to cause the igniter to start operation if a temperature of the combustion catalyst as measured by the temperature sensor is not lower than a first prescribed temperature and flameout of the combustion in the combusted space is recognized.

3. The fuel cell device according to claim 2, wherein supply amounts of the fuel gas and the oxygen-containing gas, supplied to the fuel cell in the decreased supply amount less than the supply amount set in accordance with the decreased power required by the external load, are minimum flow rates.

4. The fuel cell device according to claim 3, wherein the controller is further configured to maintain an amount of the fuel gas and an amount of the oxygen-containing gas at the minimum flow rates, and configured to maintain the operation of the igniter if a temperature of the combustion catalyst after a prescribed time has elapsed since starting operation of the igniter is lower than the first prescribed temperature but not lower than a second prescribed temperature that is set lower than the first prescribed temperature.

5. The fuel cell device according to claim 3, wherein the controller is further configured to increase a supply amount of the fuel gas and the oxygen-containing gas supplied from the fuel gas supply device and the oxygen-containing gas supply device, and to terminate the operation of the igniter if a temperature of the combustion catalyst after a prescribed time has elapsed since starting operation of the igniter is less than a second prescribed temperature that is set lower than the first prescribed temperature.

6. The fuel cell device according to claim 5, wherein the controller is further configured to set an amount of increased power generated due to the increased power required by the external load to a value less than that used during normal operation for a prescribed period of time after the temperature of the combustion catalyst becomes lower than the second prescribed temperature.

7. The fuel cell device according to claim 6, wherein the controller is configured to set the amount of increased power generated due to the increased power required by the external load to a value equal to the use during normal operation after the prescribed period of time has elapsed.

8. The fuel cell device according to claim 5, wherein the controller is further configured to increase the supply amounts of the fuel gas and the oxygen-containing gas supplied from the fuel gas supply device and the oxygen-containing gas supply device if the temperature of the combustion catalyst measured by the temperature sensor increases from below the second prescribed temperature to above the second prescribed temperature, but stays below the first prescribed temperature.

9. The fuel cell device according to claim 5, further comprising:
a flowmeter configured to measure a flow rate of the fuel gas supplied from the fuel gas supply device,
wherein the controller is configured to allow the oxygen-containing gas supply device to increase the supply amount of the oxygen-containing gas after the flow rate measured by the flow meter remains equal to a specified flow rate specified to the fuel gas supply device for the prescribed time when the controller allows the fuel gas supply device and the oxygen-containing gas supply device to increase the supply amount of the fuel gas and the oxygen-containing gas after the temperature of the combustion catalyst decreases below the second prescribed temperature.

10. A fuel cell device comprising:
a fuel cell;
a gas supplier configured to supply a fuel gas to the fuel cell;
an igniter configured to combust the fuel gas wasted from the fuel cell;
a catalyst configured to purify a combusted gas combusted by the igniter;
a temperature sensor configured to measure a temperature of the catalyst; and
a microcomputer configured to supply the fuel gas to the fuel cell through the gas supplier in a decreased supply amount less than a supply amount to be set in accordance with a decreased power request from the external load and to activate the igniter when the temperature sensor measures a temperature higher than a predetermined temperature.

11. A fuel cell device comprising:
a fuel cell;
a gas supplier configured to supply a fuel gas to the fuel cell;
an igniter configured to combust the fuel gas wasted from the fuel cell;
a catalyst configured to purify a combusted gas combusted by the igniter;
a temperature sensor configured to measure a temperature of the catalyst; and
a control means for supplying the fuel gas to the fuel cell a decreased supply amount less than a supply amount to be set in accordance with a decreased power request from the external load and for activating the igniter when the temperature sensor measures a temperature higher than a predetermined temperature.

* * * * *